(12) United States Patent
Kelly

(10) Patent No.: US 8,622,324 B2
(45) Date of Patent: Jan. 7, 2014

(54) VOC-LESS ELECTROSTATIC FLUID DISPENSING APPARATUS

(71) Applicant: ZYW Corporation, Princeton Junction, NJ (US)

(72) Inventor: Arnold James Kelly, Princeton Junction, NJ (US)

(73) Assignee: ZYW Corporation, Princeton Junction, NJ (US)

( * ) Notice: Subject to any disclaimer, the term of this patent is extended or adjusted under 35 U.S.C. 154(b) by 0 days.

(21) Appl. No.: 13/650,962

(22) Filed: Oct. 12, 2012

(65) Prior Publication Data

US 2013/0092765 A1 Apr. 18, 2013

Related U.S. Application Data

(60) Provisional application No. 61/547,354, filed on Oct. 14, 2011.

(51) Int. Cl.
| | | |
|---|---|---|
| *B01D 17/00* | (2006.01) | |
| *B05B 5/00* | (2006.01) | |
| *F23D 11/32* | (2006.01) | |
| *G03G 15/02* | (2006.01) | |
| *B05B 5/053* | (2006.01) | |

(52) U.S. Cl.
USPC ........ 239/708; 239/328; 239/690; 239/690.1; 361/225; 361/228

(58) Field of Classification Search
USPC .............. 239/320, 328, 375, 690, 690.1, 708; 361/225, 228
See application file for complete search history.

(56) References Cited

U.S. PATENT DOCUMENTS

| 4,380,786 | A | * | 4/1983 | Kelly | 361/228 |
|---|---|---|---|---|---|
| 5,221,050 | A | * | 6/1993 | Jeffries et al. | 239/708 |
| 5,316,221 | A | * | 5/1994 | Glover et al. | 239/708 |
| 6,318,647 | B1 | * | 11/2001 | Gaw et al. | 239/690 |
| 6,682,004 | B2 | * | 1/2004 | Kadlubowski et al. | 239/690 |
| 7,614,572 | B2 | * | 11/2009 | Yamaguchi et al. | 239/690 |

FOREIGN PATENT DOCUMENTS

| EP | 0 501 725 A1 | 9/1992 |
|---|---|---|
| EP | 0 554 099 A1 | 8/1993 |
| WO | 2005/075092 A1 | 8/2005 |

OTHER PUBLICATIONS

International Search Report and Written Opinion, PCT/US2012/060148, mailed Jan. 28, 2013, 9 pp.

* cited by examiner

*Primary Examiner* — Ryan Reis
(74) *Attorney, Agent, or Firm* — Chipperson Law Group, P.C.; Rita C. Chipperson

(57) ABSTRACT

Systems and methods for rapidly atomizing and dispensing electrostatically atomized insecticides and similar low electrical conductivity active materials without the use of VOCs. The active materials are dispensed via insertion of a disposable cartridge in a dispensing apparatus. The dispensing apparatus is hand actuated and the exhausted cartridge is minimized to the size of a wad of chewing gum and it is doubly sealed to prevent any residual active material from leaking into the environment. Spray flow and configuration may be user selectable.

18 Claims, 10 Drawing Sheets

VOC-LESS ELECTROSTATIC FLUID DISPENSING APPARATUS

BACKGROUND OF THE INVENTION

Embodiments of the present invention generally relate to systems and methods for dispensing electrostatically atomized active materials without the use of volatile organic compounds ("VOCs"). More specifically, embodiments of the present invention generally relate to systems and methods for rapidly atomizing and dispersing insecticides and similar low electrical conductivity fluids without the use of propellants and other additives.

The aerosol can dispenser is a staple of modern society. Produced by the billions, the modern aerosol can is capable of dispensing, on demand, high flow-rate (gram/sec), finely aerosolized doses of a wide array of products. Despite its continued refinement and utility, the aerosol can dispenser is a fundamentally inefficient and polluting means for spray generation and transfer of active material to a target.

By way of example, a popular, archetypical insecticidal aerosol can has a net weight of about 370 grams (13 ounces) of which the active ingredients (Pyrethrins) and "related" materials (including "petroleum distillate") account for less than 2% of the total weight of ingredients. The remaining "inert" material, some 98.087%, is required for the aerosolization process. To atomize and disperse less than eight grams of active material requires in excess of 360 grams of environmentally detrimental propellant/diluent plus a costly pressure vessel and atomizing nozzle.

The aerosol can dispenser is simply a hydraulic or gas assisted nozzle. Operational pressure (of about 5 bar), consisting of hydraulic pressure, propellant vapor, or a combination of the two, mechanically and aerodynamically converts bulk fluid into a directed droplet plume. With a broad droplet size distribution characterized by a significant population of small (<10 micron) droplets, these readily stagnated aerosols also present a respirable health hazard. This highly inefficient atomization and dispersal process is effective, but it is so at a cost. The environmental impact of the propellants dumped into the atmosphere, discarded pressure vessels, and the inhalation health hazards of repeated exposure to the spray are costs that have yet to be to be fully addressed.

Well-proven direct charge injection electrostatic atomizer technology provides high instantaneous flow rates of the small volumes of active ingredients required for all applications of interest. Charged spray droplets so produced are self-dispersive, preferentially enveloping and wrapping around the target. Transfer of fluid to the target is inherently more effective than is possible using conventional aerosol dispensers. Of equal importance, the charged spray cannot form a respirable cloud. Having droplet size distributions three or more times narrower than non-charged sprays, small (<10 microns) and large (≥100 microns) droplets are absent. All droplets are charged, attracted to the target, and cannot be inhaled.

Most importantly, modest feed pressures (less than one bar) available by hand pumping are sufficient to generate self-dispersive small droplet plumes. This capability permits the elimination of VOCs such as propellants and diluents as well as the high-pressure container previously required for atomization/dispersion. However, current manifestations of direct charge injection electrostatic atomizers are bulky and costly.

What is needed is an alternative aerosolization and/or dispensing apparatus that eliminates the propellants and/or diluents inherent in aerosol can operation. It is an object of this invention to provide a disposable, hand-held, low-pressure electrostatic atomizer capable of providing the same level of low-cost, operator-friendly convenience of an aerosol can without detrimental impact on the environment or user health and in which only "active", undiluted ingredients are sprayed.

BRIEF SUMMARY OF THE INVENTION

Disclosed is a portable apparatus for electrostatically dispensing fluid including: an activating mechanism; a high voltage generator to provide a high voltage; a power source to supply power to said high voltage generator; a disposable cartridge; a pressurizing mechanism connected to said activating mechanism to be driven thereby, said pressurizing mechanism located adjacent said disposable cartridge and in communication with a second end of said disposable cartridge for deforming and pressurizing said disposable cartridge; a housing, said housing substantially enclosing at least a portion of said activating mechanism, said high voltage generator, said power source, and said pressurizing mechanism, said housing including a first cartridge receptacle for detachably receiving said disposable cartridge; and a spray charge dissipation mechanism.

The disposable cartridge includes: a reservoir containing said fluid; a fluid output channel extending from said reservoir through an exterior wall of a first end of said disposable cartridge; and a movable orifice structure located adjacent and external to said exterior wall of said first end of said disposable cartridge, said movable orifice structure including at least one exit aperture, a conductor, and an insulator, said at least one exit aperture passing through said conductor, said conductor electrically grounded when said disposable cartridge is located in said dispensing position, said insulator positioned to cover an external end of said fluid output channel and said emitter electrode when said movable orifice structure is located in a non-dispensing position thereby isolating said emitter electrode and said fluid from an environment external to said disposable cartridge, said movable orifice structure connected to said activating mechanism to be positioned thereby relative to said channel when said disposable cartridge is located in said dispensing position; an emitter electrode including an emitter electrode tip and an emitter electrode contact, said emitter electrode contact located exterior to said disposable cartridge and said emitter electrode tip located internal to said disposable cartridge, said emitter electrode contact electrically connected to said high voltage generator for electrostatically charging said fluid when said disposable cartridge is in a dispensing position, said emitter electrode tip positioned to substantially axially align with one of said at least one exit apertures when said movable orifice structure is in said dispensing position; and an emitter electrode channel extending from said emitter electrode tip to said fluid output channel, said emitter electrode channel axially aligned with said emitter electrode tip.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments, which are presently preferred. It should be understood, however, that the invention is not limited to the precise arrangements and instrumentalities shown. In the drawings.

DETAILED DESCRIPTION OF THE INVENTION

Figure 1:
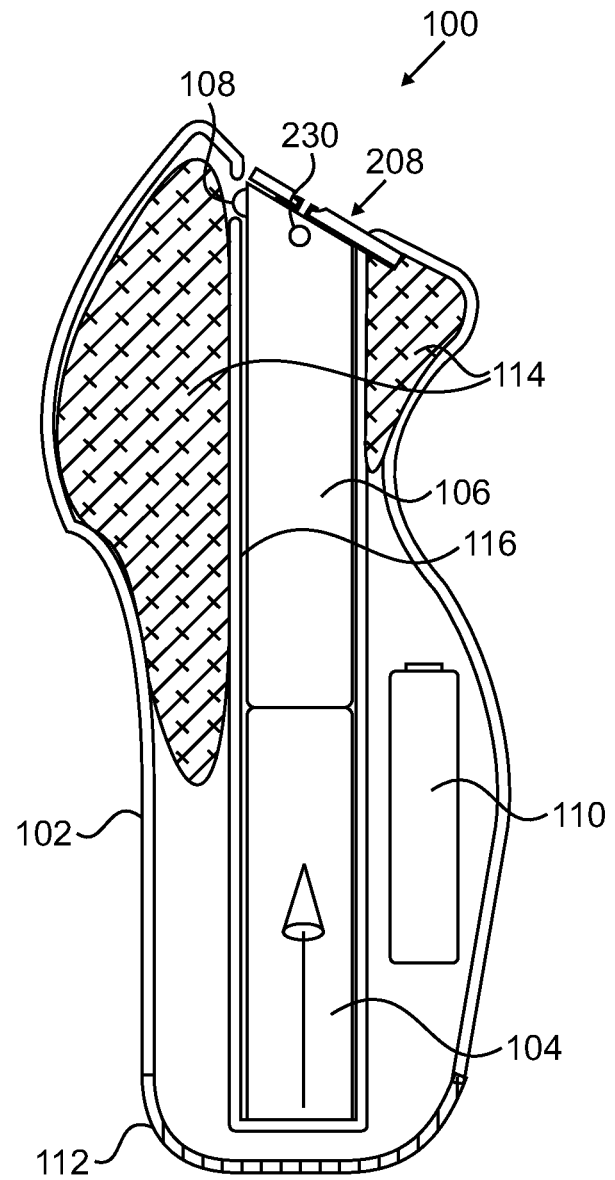
FIG. 1 is a schematic view of an apparatus for electrostatically dispensing fluid in accordance with one embodiment of the present invention.

Certain terminology may be used in the following description for convenience only and is not limiting. The words "lower" and "upper" and "top" and "bottom" designate directions in the drawings to which reference is made. The terminology includes the words above specifically mentioned, derivatives thereof and words of similar import.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods, constructs and materials are now described. All publications mentioned herein are incorporated herein by reference in their entirety. Where there are discrepancies in terms and definitions used in references that are incorporated by reference, the terms used in this application shall have the definitions given herein.

The objects of the present invention can be achieved by an electrostatic, self-contained fluid dispensing device which can be hand-held and hand operated and includes a disposable fluid cartridge. In addition to containing the spray fluid, each cartridge has an orifice structure and an integral direct charge injection emitter electrode to facilitate electrostatic atomization. This inexpensive atomizer is capable of providing a convenient, high, instantaneous flow-rate and controlled-dosage spray profile equivalent to that provided by an aerosol can.

The exhausted disposable plastic cartridges can reduce the eco-footprint to that of a wad of chewing gum. Residual active material is trapped in the exhausted cartridge, is doubly sealed against leakage, and is environmentally benign. The dispensing device includes a housing which encloses a power source for the electrostatic atomizer and an activating mechanism for producing pressure for the fluid cartridge and for moving an orifice structure. The housing includes a receptacle for accepting and removably holding the fluid cartridge. When placed into the receptacle, the fluid cartridge makes electrical connection with the power supply and mechanical connection with the activating mechanism.

The activating mechanism is at least partially situated within the housing to provide a sufficient amount of pressure within the fluid cartridge and adequate movement of the orifice structure when a predetermined amount of pressure and motion is applied thereto via activation of the mechanism by an operator. The mechanism is activated by the operator squeezing a handle or other mechanical lever. The replaceable cartridge is sized to provide single or multiple dosages of concentrated active ingredients, preferably about 10 mL to about 60 mL.

Hand-activation of the device simultaneously activates an atomizer and applies pressure to the fluid within the fluid cartridge sufficient to propel the fluid out of the fluid cartridge. Activation of the atomizer includes moving an orifice structure having exit apertures such that at least one of the exit apertures aligns with a fluid output channel and an emitter electrode tip, thereby allowing the fluid to be electrostatically charged inside the fluid output channel to allow for atomization and dispersion of the fluid after it exits the device.

Linear Orifice Structure

Referring first to FIG. 1, depicted is a schematic view of a dispensing apparatus 100 for electrostatically dispensing fluid. Dispensing apparatus 100 includes, inter alia, housing 102, pressurizing mechanism 104 (shown in a fully extended position), disposable cartridge 106, cartridge receptacle 116, disposable cartridge emitter electrode contact 108, power supply 110, spray charge dissipation mechanism 112, and actuator cavities 114.

Figure 2:
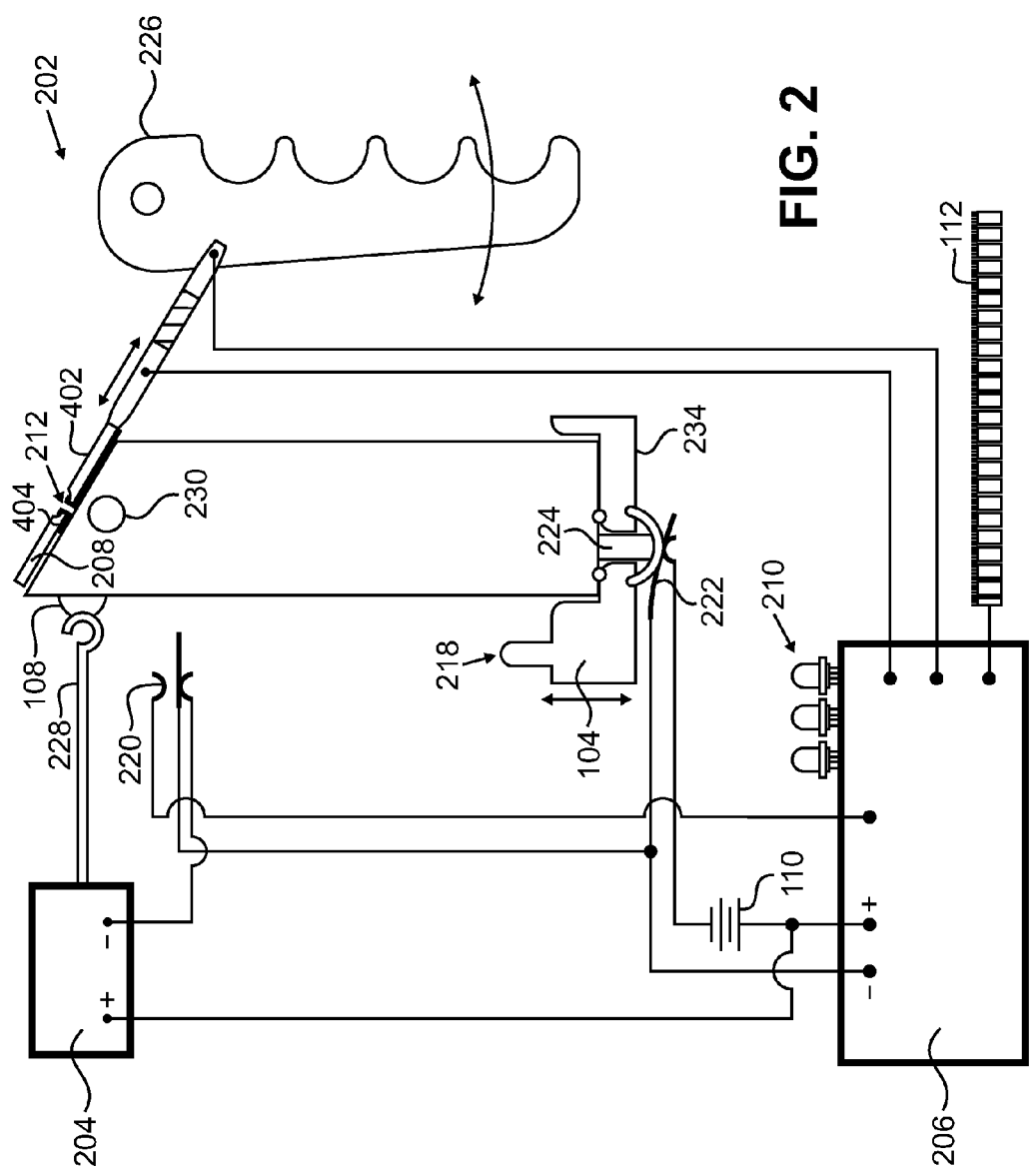
FIG. 2 is an exemplary electrical circuit diagram of the apparatus of FIG. 1 in accordance with one embodiment of the present invention.

The ergonomic housing 102 is configured to be hand-held and to provide sufficient space for all components used in the apparatus. Such components include, but are not limited to, for example, cartridge receptacle 116 for receiving and removably holding cartridge 106, power supply 110, electrical circuitry 202 (FIG. 2), pressurizing mechanism 104, spray charge dissipation mechanism 112, and activating mechanism (not shown) the latter of which includes, inter alia, pressurizing mechanism 104 and lever 226 (FIG. 2). The approximate size of housing 102 and its component is indicated by the 10 mm scale depicted in FIG. 1.

Cartridge receptacle 116 preferably comprises a securing mechanism for removably securing cartridge 106 within cartridge receptacle 116. Examples of suitable securing mechanisms include, but are not limited to, friction fittings, pins, screws, spring-loaded pins, spring loaded latch(es), and the like. The securing mechanism can be manually or automatically engaged when cartridge 106 is fully placed within cartridge receptacle 116.

In one preferred embodiment, cartridge 106 is held securely within cartridge receptacle 116 via engagement of one or more locking receptacles 230 with corresponding spring-loaded, semi-spherical pins mounted to, or passing through, a wall of cartridge receptacle 116. Upon insertion of cartridge 106 into cartridge receptacle 116, each spring-loaded pin is sufficiently depressed into the wall of cartridge receptacle 116 to allow cartridge 106 to pass into cartridge receptacle 116. Full insertion of cartridge 106 into the proper position within cartridge receptacle 116 causes alignment of the spring-loaded, semi-spherical pins with their corresponding locking receptacles 230, thereby allowing the spring-loaded pins to release into locking receptacles 230 and thereby locking cartridge 106 into cartridge receptacle 116. Such locking prevents or minimizes movement of cartridge 106 within cartridge receptacle 116 particularly during pressurization of cartridge 106 and/or activation of lever 226. As cartridge 106 is fully exhausted, pressurizing mechanism 104 travels further into cartridge receptacle 116 and causes one or more disengagement extensions 234 to exert pressure on the spring-loaded, semi-spherical pins causing them to depress and disengage from locking receptacles 230. This allows the operator to easily remove cartridge 106 from cartridge receptacle 116 when cartridge 106 is exhausted.

In the embodiment of the present invention depicted in FIGS. 1-4C, electrical circuitry 202 includes voltage converter 204 for providing sufficient high voltage to power emitter electrode 318 as well as comparator circuitry 206, the latter of which provides the operator with indication of one or more operational statuses of the apparatus. DC-DC voltage converter 204 converts the voltage from power supply 110 to a voltage sufficient to power the electrostatic atomizer, preferably within the range of −5 kV to −10 kV or −500 V to −15 kV with output currents within the range of −1 μA to −10 μA or −1 μA to −100 μA.

In one embodiment of the present invention, the output of the DC-DC voltage converter 204 includes short protection to avoid damage to dispensing apparatus 100 in the event that one or more of exit apertures 212 become clogged, or otherwise inoperable, or an electrical short is caused due to the presence of foreign matter in the inter-electrode (emitter-orifice) region. That is, DC-DC voltage converter 204 can tolerate continuous shorting of its output without damage. The output voltage ripple of DC-DC voltage converter 204 is preferably less than 3%, but generally can be 10%, or larger, due the accommodating design of dispensing apparatus 100. Dispensing devices such as dispensing devices 100, which are not subject to breakdown and spray disruption from voltage excursions and/or variations, are inherently insensitive to power supply variations caused by voltage ripple at the levels noted above.

The design of DC-DC voltage converter 204 of dispensing device 100 is optimized to achieve low cost production having a preferred cost of less than $10 per unit. More expensive converters may be substituted without departing from the scope of the present invention, for example, as dictated by market requirements. Preferably, DC-DC voltage converter 204 has a total volume of less than 20 mL, however, larger volume converter and converter designs may be easily accommodated within housing 102 of the dispensing apparatus 100. In one embodiment, DC-DC voltage converter 204 circuitry is separated between two or more interconnected modules to permit them to be distributed within the confines of housing 102 of dispensing apparatus 100 while providing the same functionality as a single circuit board DC-DC voltage converter.

Power supplies 110 may include, but are not limited to, for example: disposable batteries including, without limitation, one or more AA batteries and one or more 9 volt transistor batteries; replaceable or rechargeable batteries; fuel cells; solar power; alternators; and mechanically actuated generators including, without limitation, piezo- or tribo-electric generators actuated by lever 226. In one embodiment, power supply 110 includes three (3) AA batteries, which is electrically connected to electrical circuitry 202 as depicted in FIG. 2 and will provide the requisite fixed output voltage of DC-DC voltage converter 204 as the power supply 110 voltage varies with use from approximately 4.8 V to approximately 3.6 V.

Comparator circuitry 206 accepts current from orifice structure 208, lever 226 (which is a conductive operating lever in the depicted embodiment), and spray charge dissipation mechanism 112. Spray dissipation may include, but is not limited to, for example, a static wick or drag-line which acts to dissipate spray charge build-up to the ambient atmosphere. In one embodiment, spray charge dissipation mechanism 112 is commercially available static wick material built into housing 102 which facilitates a convenience of use similar to that of an aerosol can.

In an alternate embodiment of the present invention, spray charge dissipation mechanism 112 is one or more brush strips including, without limitation, Ultra Stat® Static Elimination Brushes as manufactured by Ultrafab, Inc. This dissipation mechanism is capable of dissipating the approximately one μA spray current generated by dispensing device 100, which is important for achieving continuous spray operation. In one embodiment, the length of the linear brush strips is less than 20 cm, and the length of the bristles thereof is approximately 6 mm long. This size allows the brush strips to be easily integrated into dispensing device 100.

In yet another alternate embodiment, spray charge dissipation mechanism 112 is an anti-static paint such as that manufactured by AntiStatic Industries. In one such embodiment, an approximately 3 cm by 4 cm swatch of anti-static paint is applied to the base of housing 102 of dispensing device 100. However, alternate spray charge dissipation mechanisms may be substituted for any of those discussed above including, without limitation, thoriated, lanthanated, or cesiated tungsten wires, reconstructed oxide-metal composites, and 325 by 325 0.0014" diameter stainless steel wire mesh.

Based on the relative levels of these three currents, comparator circuitry 206 actuates appropriate indicators 210 to indicate status to the operator including, but not limited to, for example: apparatus 100 is in stand-by mode; apparatus 100 is operating properly; cartridge 106 is empty; and/or one of exit apertures 212 is clogged and a new exit aperture 212, if applicable, must be moved into place. Indicators 210 include, but are not limited to, for example, lights, buzzers, vibrators, and other visual, mechanical, and/or audible alarms.

More specifically, in the absence of current flow to spray charge dissipation mechanism 112, structure orifice 208, and/or lever 226, comparator circuitry 206 indicates that apparatus is in stand-by mode (or its non-dispensing position). Once apparatus 100 begins spraying fluid 310, current flow to spray charge dissipation mechanism 112, structure orifice 208, and/or lever 226 begins. Upon sensing same, comparator circuitry 206 indicates to the operator via an indicator 210 that apparatus 100 is operating properly. In addition, when cartridge depleted switch 220 is actuated by indicator extension 218, the change in position of switch 220 indicates to comparator circuitry 206 that pressurizing mechanism 104 is fully extended and replacement of cartridge 106 is required. Lever action, in the absence of both current to spray charge dissipation mechanism 112 and a signal from switch 220 that cartridge 106 is depleted, indicates that orifice structure 208 is clogged, defective, and in need of substitution or replacement.

As best seen in FIGS. 1 and 3, pressurizing mechanism 104 provides sufficient pressure to fluid reservoir 302 to eject fluid 310 through fluid output channel 314, past emitter electrode tip 320, and out of cartridge 106 through exit aperture 212. In a preferred embodiment, pressurizing mechanism 104 is a piston and a mechanism for moving the piston, such mechanism coupled to lever 226 and actuated by an operator of apparatus 100.

Fluid 310 is contained within fluid reservoir 302 of cartridge 106 by orifice structure 208 which acts to seal fluid output channel 314 when it is located in a non-dispensing position. Fluid 310 may be any non-conductive fluid including, but not limited to, for example, insecticides, lubricating oils (e.g., WD-40), cooking oils (e.g., Canola, Soy, Olive, and Corn oils), fragrances, pharmaceuticals, grooming products, coatings, and the like.

Pressurizing mechanism 104 is located internal to housing 102, and it engages cartridge 106 after insertion thereof into cartridge receptacle 116. Pressurizing mechanism 104 moves longitudinally within cartridge 106, thereby applying pressure to fluid reservoir 302 as pressurizing mechanism 104 moves into cartridge 106.

In a preferred embodiment, pressurizing mechanism 104 includes indicator extension 218 external to cartridge 106, which moves along with pressurizing mechanism 104 and which engages cartridge depleted switch 220 when fluid 310 is fully expended from fluid reservoir 302 and pressurizing mechanism 104 has moved to the end of its range of motion. The change of position of cartridge depleted switch 220 due to activation of same by indicator extension 218 causes comparator circuitry 206 to indicate a cartridge empty alarm to the operator via, for example, an indicator 210, thereby notifying the operator that the cartridge is in need or removal or replacement.

Pressurizing mechanism 104 also includes one or more disengagement extensions 234, which, at the end of its range of motion, disengages one or more cartridge securing mechanisms to unlock cartridge 106 from cartridge receptacle 116. Disengagement extensions 234 also disengage orifice structure 208 from the activating mechanism, thereby allowing an operator to remove cartridge 106 from cartridge receptacle 116 and housing 102.

Housing 102 includes an activating mechanism for activating one or more mechanisms within apparatus 100 including, but not limited to, orifice structure 208 and pressurizing mechanism 104, ultimately resulting in the initiation of one or more atomized sprays. Such an activation mechanism could include one or more solenoids and switches, mechanical linkages and gears, any combination thereof, or the like.

When cartridge 106 is fully secured and seated in cartridge receptacle 116, it causes a number of things to occur, including, but not limited to: 1) cartridge 106 is secured to housing 102 by one or more securing mechanisms; 2) mechanical and electrical connections are established between the activating mechanism and the moveable orifice structure 208; and 3) emitter electrode contact 108 physically contacts voltage converter contact 228 thereby causing voltage converter 204 to supply power to emitter electrode 318 for energization of the latter.

Requiring the secure seating of cartridge 106 in cartridge receptacle 116 prior to energization of voltage converter 204 assures absolute isolation of the operator from the internal high voltage source provided by voltage converter 204 to converter contact 228 since orifice structure 208 is located in the non-dispensing position prior to insertion of cartridge 106 into housing 102. That is, as discussed in greater detail herein, in the non-dispensing position, insulator 402 of orifice structure 208 covers emitter electrode 318 and fluid output passage 314 thereby isolating the environment external to apparatus 100 from fluid or current flow.

In one preferred embodiment, cartridge 106 includes a pin 224 having an upper pin section 224*a* and a lower pin section 224*b*. Insertion of cartridge 106 fully into cartridge receptacle 116 causes lower pin section 224*b* to actuate a water-proofed cartridge insertion status switch 222 mounted on pressurizing mechanism 104, thereby establishing an electrical connection between power supply 110 and electrical circuitry 202. This electrical connection energizes voltage converter 204 and comparator circuitry 206. Comparator circuitry 206 grounds the orifice structure and indicates various operational statuses including, but not limited to, the status of the insertion of cartridge 106.

In addition to establishing an electrical connection, the engagement of lower pin section 224*b* with the water-proofed cartridge insertion status switch 222 mounted on pressurizing mechanism 104 ensures the azimuthal positioning of cartridge 106. Such positioning is important to ensure that emitter electrode contact 108 makes contact (and an electrical connection) with the recessed converter conductor 228.

The mechanical connection of orifice structure 208 to the activating mechanism occurs via engagement of notches 418 with indexing structures of the activating mechanism as discussed in greater detail below with regards to FIGS. 3 and 4A-4C.

Figure 3:
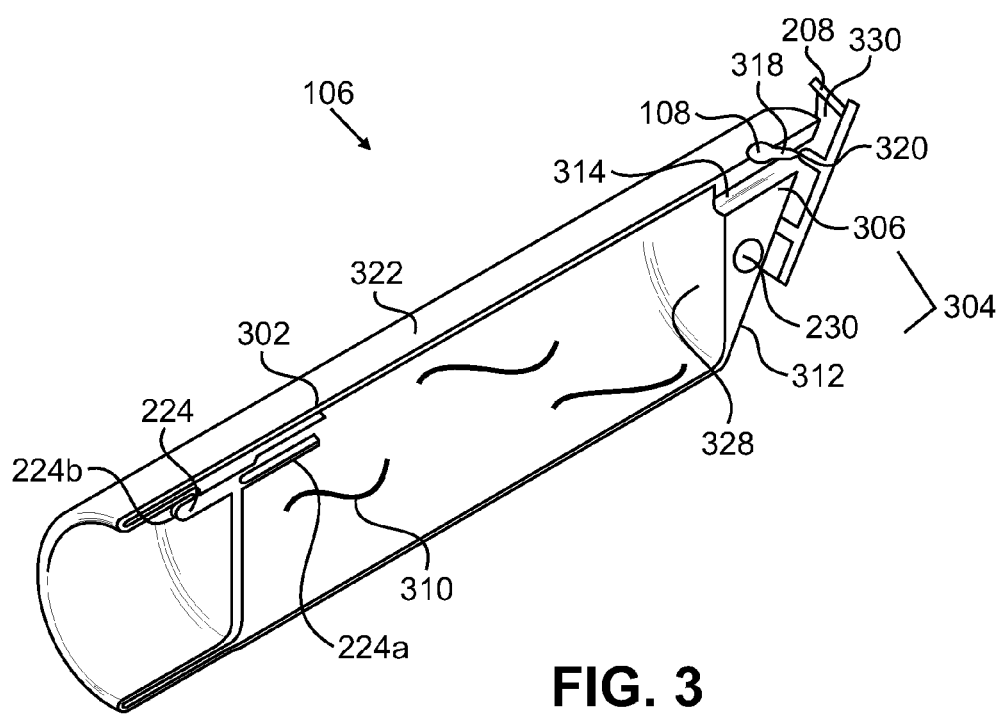
FIG. 3 is an angled cross-sectional view of a disposable cartridge having a linear orifice structure.
Figure 4A:
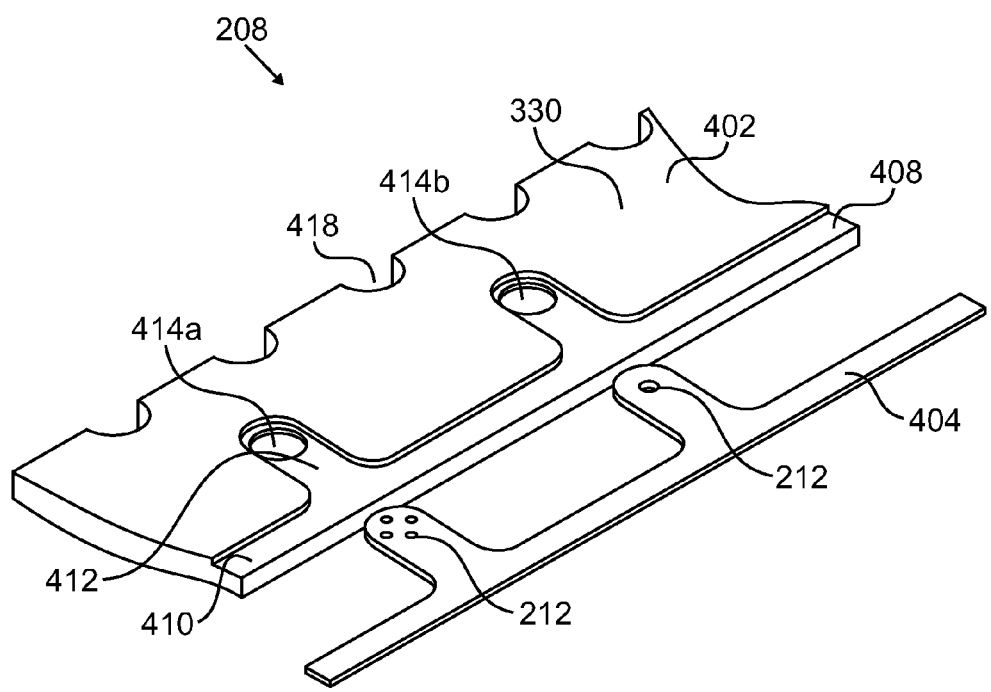
FIG. 4A is an exploded view of the linear orifice structure of the disposable cartridge depicted in FIGS. 1-3.
Figure 4B:
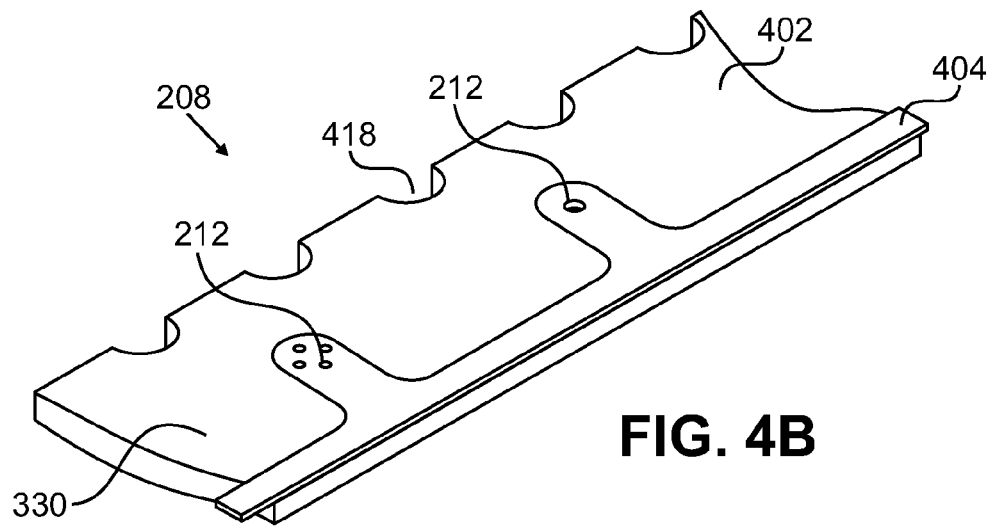
FIG. 4B is an assembled interior view of the linear orifice structure of the disposable cartridge depicted in FIGS. 1-4A.
Figure 4C:
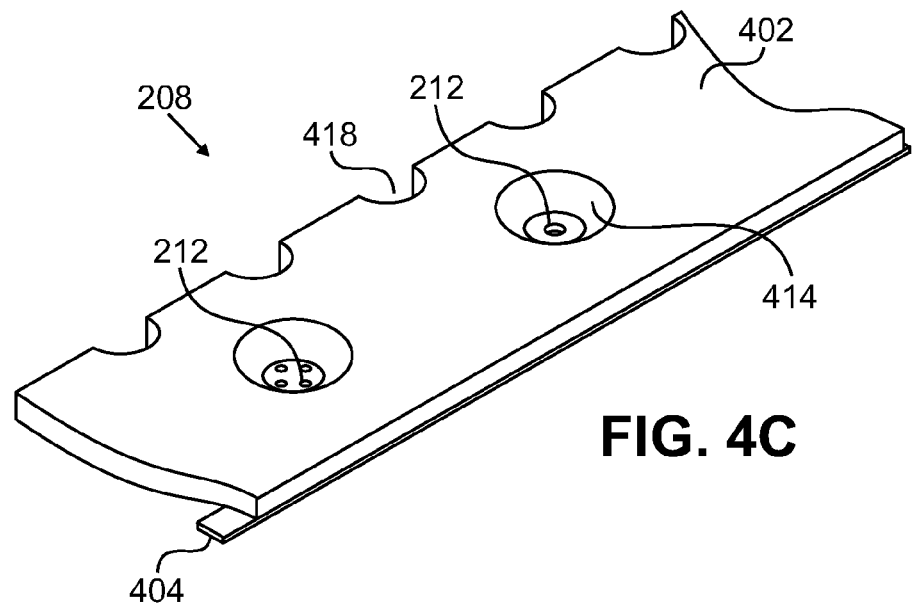
FIG. 4C is an assembled exterior view of the linear orifice structure of the disposable cartridge depicted in FIGS. 1-4B.
Figure 5:
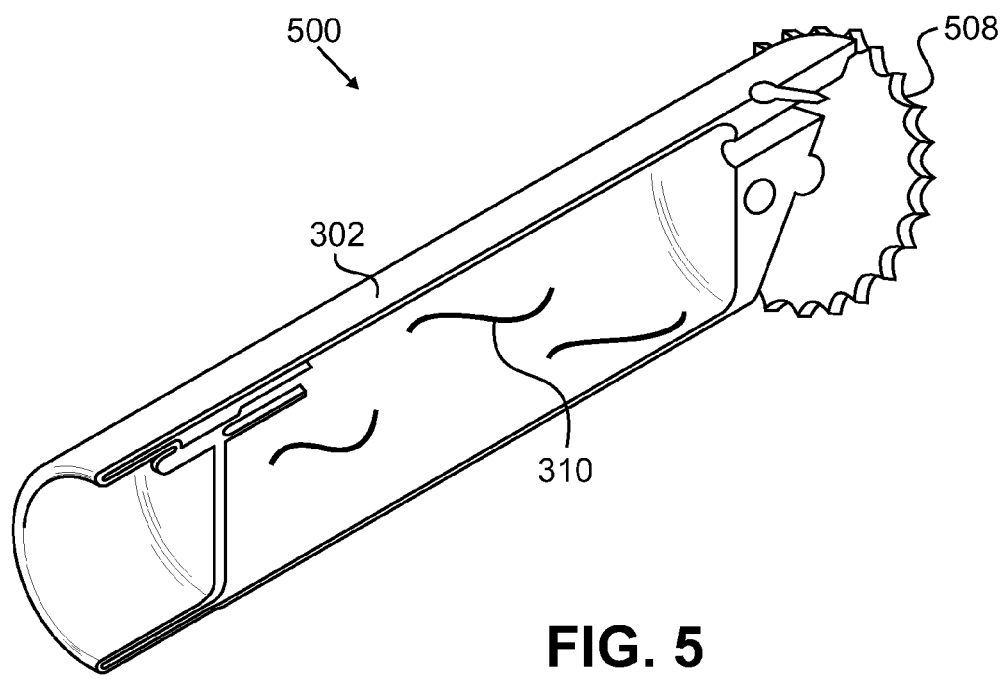
FIG. 5 is an angled cross-sectional view of a disposable cartridge of an apparatus for electrostatically dispensing fluid having a rotary orifice structure in accordance with an alternate embodiment of the present invention.

Turning now to FIG. 3, depicted is an angled, cross-sectional view of disposable cartridge 106 having a linear orifice structure 208. Disposable cartridge 106 includes a substantially cylindrical reservoir 302, the topmost end of which includes dispensing apparatus 304. Dispensing apparatus 304 includes head 306, emitter electrode 318, fluid channel 314, locking receptacle 230, and orifice structure 208.

In one embodiment of the present invention, cartridge 106 is manufactured of a thin walled, flexible, electrically insulating material including, but not limited to, for example, polyethylene, polypropylene, or other flexible polymers having good to excellent electrical and mechanical properties. The use of such material allows the bottommost portion of the walls of cartridge 106 to fold into itself due to the force exerted by pressurizing mechanism 104 as it progresses upward and into cartridge 106. This force decreases the size of reservoir 302, thereby applying pressure to fluid 310. This is best seen in FIG. 3 in which cartridge 106 is shown in a partially exhausted condition, pressurizing mechanism 104 having folded the rearward casing of cartridge 106 inward.

In a preferred embodiment, the shape of pressurizing mechanism 104 closely conforms to that of cartridge 106 to allow pressurizing mechanism 104 to fold the cartridge in a manner that minimizes the amount of fluid 310 trapped between the interior folded surfaces of cartridge 106. This feature minimizes the waste and environmental impact associated with the discarded cartridge 106. Alternate embodiments may be substituted including, but not limited to, for example, cartridges having accordion pleating.

Cartridge 106 includes a pin 224 having an upper pin section 224*a* and a lower pin section 224*b*. Upper pin section 224*a* is substantially cylindrical and fits tightly into fluid output channel 314 when cartridge 106 is fully exhausted. When cartridge 106 is completely exhausted, the walls of cartridge 106 are collapsed upon and pressed against reservoir upper interior wall 328, thereby sealing any fluid trapped within the interior folded walls, creases, or crevasses of depleted cartridge 106 from leakage to the environment. In this position, upper pin section 224*a* is forced into fluid output channel 314, precisely mating therewith and thereby facilitating the spraying of any residual fluid 310 from cartridge 106. That is, when cartridge 106 is in an almost completely exhausted state, upper pin section 224 is located internal to fluid output channel 314 and any fluid remaining in pin cavity 326 is electrostatically atomized by emitter electrode 318, thereby forcing the atomized fluid 310 out of cartridge 106 through the corresponding exit aperture 212.

Once cartridge 106 is completely exhausted and pressure is released from lever 226, orifice structure 208 returns to its non-dispensing state, thereby causing any minimal residual fluid trapped within the interior folded walls, creases, or crevasses of depleted cartridge 106 to be redundantly sealed within the depleted cartridge 106 (and from leakage to the environment) via the contact between the uppermost end of upper pin section 224a and fluid output channel 314 with interior face 330 of orifice structure 208. This sealing occurs prior to the removal of the depleted cartridge 106.

The topmost portion of reservoir 302 is bounded by head 306. Face 312 of head 306 is substantially planar and is located at an angle of approximately thirty (30) degrees relative to the axis of substantially cylindrical reservoir 302. Substantially cylindrical fluid output channel 314 passes from reservoir 302 through head 306 in alignment with one or more exit apertures of orifice structure 208 when such structure is located in a dispensing position.

Emitter electrode 318 includes emitter electrode contact 108 and emitter electrode tip 320. Emitter electrode contact 108 is embedded in the substantially cylindrical outwardly facing wall 322 of disposable cartridge 106. Emitter electrode tip 320 is positioned toward fluid output channel 314. The position of emitter electrode tip 320 relative to the exit aperture 212 aligned with fluid output channel 314 is that which best achieves the desired operating voltage for emitter electrode 318. Typical distances between emitter electrode tip 320 and exit aperture 212 vary from a minimum of approximately one half of the radius of exit aperture 212 to a maximum of two to four times the length of the radius of exit aperture 212. When multiple exit apertures 212 are served by a single centrally positioned emitter electrode tip 320, distances between the two may exceed ten times the radius of exit aperture 212.

The limited useful operational life of approximately several minutes of cartridge 106 permits consistent charge injection of fluid 310 to be reliably achieved with micron diameter sized emitter electrodes. In some embodiments, emitter electrode 318 is a thoriated tungsten wire electrode or lanthanum doped tungsten wire electrode having a diameter greater than 1 micron and less than 100 microns, however, other emitter electrodes may be substituted. Use of such emitter electrodes provides more than adequate charge injection at useful voltage levels and drastically reduces the cost of manufacturing cartridge 106.

As discussed in further detail below with respect to orifice structure 208, when energized, emitter electrode tip 320 electrostatically charges fluid 310 as it passes through the path of emitter electrode tip 320 as it is exiting cartridge 106 through fluid output channel 314 prior to being dispensed through one or more exit apertures 212. That is, in one embodiment of preferred operation, fluid 310, under pressure, exits reservoir 302 through fluid output channel 314 past emitter electrode tip 320 and out through one or more exit apertures 212 in orifice structure 208. As fluid 310 passes over emitter electrode tip 320, it becomes electrically charged and subsequently atomizes and self-disperses after exiting cartridge 106 through exit aperture(s) 212.

In a preferred embodiment, orifice structure 208 is moveable and slides or rotates to position an exit aperture 212 into and out of alignment with fluid output channel 314 and emitter electrode 320. Orifice structure 208 can be moved between two basic states: 1) fluid output channel 314 closed to the environment and emitter electrode 318 electrically insulated from environment (i.e., the non-dispensing position); and 2) fluid output channel 314 open to the environment and orifice structure 208 is grounded (i.e., the dispensing position). Orifice structure 208 moves into the dispensing position to dispense fluid 310 from within reservoir 302 when a user squeezes lever 226 or another similar activation mechanism. Grounding of orifice structure 208 eliminates a shock hazard for the user when apparatus 100 is in its dispensing position.

Turning now to FIGS. 4A-4C, linear orifice structure 208 includes insulator 402 and conductor 404. Linear orifice structures are most useful for applications such as compact burners in which clogging issues are less severe and a limited number of orifices are adequate to address clogging issues during operation. The cost of the linear orifice structure is sufficiently inexpensive to allow cartridge 106 and its associated linear orifice structure to be disposable and to accommodate use of a new cartridge 106 for each use of the apparatus.

Insulator 402 is an insulating support structure capable of supporting conductor 404. In one embodiment of the present invention, insulator 402 is manufactured of PolyEtherEther-Ketone ("PEEK") however other materials including, but not limited to, high temperature, high strength engineering plastics may be substituted. Conductor 404 is electrically conductive and is in contact with local ground. Conductor 404 includes exit apertures 212 or groupings of exit apertures 212 that align with a corresponding orifice 414.

In one embodiment of the present invention, circular or cylindrical exit apertures 212 have diameters ranging from approximately 30 microns to approximately 125 microns. In another embodiment, circular or cylindrical exit apertures 212 have diameters ranging from approximately 30 microns to approximately 500 microns. In yet another alternate embodiment, slits having widths ranging from approximately 30 microns to approximately 125 microns may be substituted for circular or cylindrical exit apertures 212 of similar size. In still another alternate embodiment, slits having widths ranging from approximately 30 microns to approximately 500 microns may be substituted for circular or cylindrical exit apertures 212 of similar size. This range is selected since, when operating at atmospheric background pressures, charged fluids exiting apertures 212 having a diameter or width less than approximately 125 microns have surface electric field levels that are less than the spray limiting electrical breakdown strength of normal atmospheric air. In contrast, when the diameters of circular exit apertures (or the widths of slit exit apertures) are greater than approximately 125 microns, spray development is abruptly disrupted when the surface electric field strength (caused by increased applied emitter electrode voltage) exceeds the breakdown field strength of the ambient air. However, when the diameters of circular exit apertures (or the widths of slit exit apertures) are maintained at a size less than approximately 125 microns, such breakdowns do not occur. In addition, the smaller the diameter or width of the aperture, the higher the electrical breakdown strength will be, thereby allowing operation at higher altitudes.

Optimal operation of apparatus 100 may be achieved over a broad range of converter voltages provided that the spray fluid does not break down as discussed above. Optimal operation includes charged fluid droplets having a maximum output charge density, minimum droplet size, and minimum distribution span. The use of relatively smaller exit apertures 212 also eliminates the need for control circuitry for maintaining optimal converter voltage (i.e., voltage within a few percent of the breakdown limit) as typically required by larger aperture devices.

Additionally, use of circular or cylindrical exit apertures 212 have diameters ranging from approximately 30 microns to approximately 125 microns (or exit slits having widths within the same range) provides at least three operational benefits. First, it allows the use of inexpensive and unregulated power supplies 110 because spray behavior will not be detrimentally affected by power supply output fluctuations. Second, it allows a fixed operating voltage to be used since spray behavior (i.e., flow rates and fluid properties) is not affected by voltage converter operating voltage fluctuations. Insensitivity to varying or inconsistent flow rates is particularly important for applications involving unregulated blowdown or hand-pumped fluid supplies as described herein. Third, the smaller the diameter of the exit aperture, the lower the minimum voltage converter operating voltage required to achieve optimal spraying. For instance, direct injection atomizers having exit apertures with an approximately 50 micron diameter can be operated at operating voltages of less than approximately 1 kV without impact on flow rate.

Furthermore, since exit apertures having relatively small diameters as discussed above operate at maximum charge density, the fluid sprays exiting therefrom exhibit the narrowest possible size distribution. That is, these size distributions have droplet size spans at least three times narrower than those of conventional aerosol atomizers. The smaller the diameter of the exit aperture, the narrower the droplet size span.

Most importantly, charged sprays exiting apertures having relatively small diameters as discussed above have well-defined size distributions characterized by the absence of large droplet "tails" and droplets smaller than approximately 10 microns. Not only are such sprays free of large and wasteful droplet populations, but droplet inhalation is not possible. The only inhalation hazard is associated with evaporated vapor as the droplets flow toward the target.

In the depicted embodiment, insulator 402 is a substantially rectangular body manufactured of any suitable insulating material such as, but not limited to, plastic, bakelite, nylon, ceramic, PEEK, glass, lexan, and the like. In both dispensing and non-dispensing positions, insulator 402 entirely covers cartridge receptacle 116 and isolates it from the exterior of the apparatus (with the exception of exit apertures 212), thereby constraining the high voltage provided by converter contact 228 to emitter electrode 318 to the interior of apparatus 100 to prevent a shock hazard for the user.

As depicted in FIG. 4A, insulator 402 includes two orifices 414 arranged in a linear manner. While the depicted embodiment includes two individual and selectable orifices, greater or lesser quantities of orifices may be substituted without departing from the scope of the present invention. Also, orifices and corresponding exit apertures need not be identical and may be configured to meet specific needs. Additionally, non-linear embodiments may also be substituted. One example of such an alternate embodiment is the six orifice, rotary embodiment discussed below with respect to FIGS. 5 and 6A-6C.

A first longitudinal edge of insulator 402 includes a plurality of substantially semi-cylindrical notches 418. Notches 418 are provided to facilitate movement of orifice structure 208 as required to dispense fluid from reservoir 302. Notches 418 of insulator 402 mate with corresponding indexing structures integral to the activating mechanism. These indexing structures index orifice structure 208 to the desired position (i.e., dispensing or non-dispensing) when lever 226 is actuated by a user. That is, via engagement with notches 418, indexing structures move orifice structure 208 to a dispensing position in which an exit aperture 212 aligns with emitter electrode tip 320 to facilitate electrostatic atomization, or to a non-dispensing position in which insulator 402 covers emitter electrode 318 and the external end of fluid output passage 314, thereby sealing cartridge 106 from, and electrically isolating it from, the external environment.

In some embodiment of the invention, notches 418 also allow an operator to select one of a plurality of orifices such as orifices 414. Such selection may be desired when orifices having different characteristics are included to allow a user to select a specific orifice configuration. However, even if all orifices are identical, an operator may wish to select a new orifice if the current orifice is clogged or otherwise unusable. To facilitate this feature, in the case of a linear orifice structure such as structure 208, lever 226 would be configured to permit translation of orifice structure 208 without pressurization of cartridge 106. One method of doing this is to disable the return stroke of lever 226 when an operator is selecting an orifice and to enable the return stroke of lever 226 when a user wishes to pressurize reservoir 302 in an effort to spray fluid 310.

Orifices 414 in orifice structure 208, as illustrated, can have different exit aperture sizes and configurations. An example, both single and multiple openings are shown. Different configurations and sizes are selected based upon, for example, the fluid used, the spray flow rate desired, and the intended use of the spray. Orifice structure 208 includes varying exit aperture configurations to allow the user to select the configuration most suited to the user's application. For example, use of an orifice having a large diameter exit aperture and/or multiple exit apertures will provide a user with a higher flow rate. Or, in another example, user of an orifice having multiple skewed exit apertures may enhance lateral dispersion of the sprayed fluid. Any configuration of exit apertures may be included without departing from the scope of the present invention.

As seen in FIGS. 4A-4C, orifice structure 208 includes two identical orifices 414*a* and 414*b*. However, the exit apertures 212 located in conductor 404 that are located within orifices 414*a* and 414*b* when orifice structure 208 is assembled vary. More specifically, the portion of conductor 404 located within orifice 414*a* includes four (4) exit apertures 212 arranged as the corners of a square. Such a configuration maximizes lateral dispersion of the sprayed fluid. In contrast, the portion of conductor 404 located within orifice 414*b* includes a single exit aperture 212 centrally located within orifice 414*b*. This orifice provides a single stream of fluid at a higher flow rate due to the larger diameter of its exit aperture.

In addition, the incorporation of multiple orifices 414 within orifice structure 208 allows an operator to select a new orifice 414 if the currently used orifice 414 becomes clogged or otherwise unusable. Such a feature increases the likelihood that an operator will have the ability to deplete all of fluid 310 in cartridge 106 prior to its replacement.

Interior face 330 of insulator 402 includes recess 408 and it is configured to mate with conductor 404 as best depicted in the exploded and assembled views of FIG. 4A and FIG. 4B, respectively. That is, groove 408 includes linear groove portion 410 and a series of curved groove inlets 412. Each groove inlet 412 includes a corresponding orifice 414. As orifice extends through insulator 402 from its interior surface to an exterior surface, its diameter enlarges in a semi-spherical manner.

When orifice structure 208 is indexed to a dispensing position and exit aperture 212 and its surrounding conductor 404 are aligned with emitter electrode 318, the electrically conductive conductor 404 and emitter electrode 318 form a charge injection electrostatic atomizer which electrostatically charges fluid 310 in fluid output channel 314 to allow it to atomize and disperse upon exiting exit aperture 212. Conversely, when orifice structure 208 is indexed to a non-dispensing position, emitter electrode 318 is aligned with insulator 404 (rather than conductor 404), which seals fluid output channel 314. In addition, emitter electrode 318 ceases to act as an electrostatic atomizer, there is no current flow from emitter electrode 318, flow of fluid 310 is ceased, and the high voltage present at the emitter electrode is isolated from the exterior of apparatus 100. This aspect of the invention allows emitter electrode 318 to be continuously maintained at operating voltage without damage to apparatus 100 or fluid 310 and without danger to an operator. This aspect also allows spraying of fluid 310 to resume immediately upon indexing of orifice structure 208 to a dispensing position via actuation of lever 226 without the need to coordinate voltage or fluid profiles, as this position causes emitter electrode 318 to realign with the conductor 404. This aspect of the invention further minimizes both the turn-on and turn-off fluid transients and orifice structure dribble. This is particularly useful for burst or pulsed-spray applications such as diesel injectors, which traditionally have a "sac" volume servicing the orifices. Contrary to the situation with conventional "sac" designs, the exit aperture(s) of the present invention are not exposed to the external environment after cut off and, therefore, fluid dribble cannot occur.

To spray fluid 310 from apparatus 100 (from reservoir 302 through fluid output channel 314 and through exit aperture 212), an operator activates the activating mechanism by squeezing lever 226 or the like with a pressure similar to that used for grease or caulking guns. The squeezing of lever 226 causes the activating mechanism to index pressurizing mechanism 104 to fold the bottommost portion of cartridge 106 into itself, thereby pressurizing cartridge 106 while simultaneously moving an exit aperture 212 of orifice structure 208 toward alignment with emitter electrode tip 320 (via engagement of indexing structures with notches 418). The mechanical linkage of the activating mechanism is configured such that pressurization of cartridge 106 is complete just prior to aligning exit aperture 212 with emitter electrode tip 320. Since emitter electrode 318 is continuously energized to operating voltage by converter conductor 228 whenever cartridge 106 is seated within cartridge receptacle 116, this mechanical arrangement causes charge injection atomization to occur as soon as the exit aperture 212 is exposed sufficiently to fluid output channel 314 to permit fluid flow. The configuration of apparatus 100 is such that the exiting fluid 310 is charged when it flows over emitter electrode tip 320 sufficiently to atomize and self-disperse after leaving exit aperture 212 and any fluid 310 that is not sufficiently charged cannot be expelled from apparatus 100 (until it is fully charged). That is, fluid 310 atomizes and self-disperses after it exits apparatus 100. This feature of apparatus 100 eliminates, or greatly minimizes, non-optimal atomization such as that exhibited by conventional (non-electrostatic) atomizers, particularly during turn-on and turn-off. The charged spray exits exit aperture 212 and causes no shock hazard to the operator due to the relatively low current level (i.e., microampere current level) of the charged spray.

When an operator ceases application of pressure to lever 226, orifice structure 208 returns to a sealed, non-dispensing position (i.e., one in which none of the exit apertures 212 is aligned with fluid output channel 314 and emitter electrode tip 320). Ceasing application of pressure to lever 226 also causes pressurizing mechanism 104 to reduce the pressure exerted on cartridge 106 and the fluid 310 contained therein. In one embodiment, pressurizing mechanism 104 is a piston and ceasing application of pressure to lever 226 causes the piston to retract, thereby reducing the pressure exerted on cartridge 106 and the fluid 310 contained therein.

When cartridge 106 is completely exhausted and/or the operator wishes to remove cartridge 106 for some other purpose, pressure is removed from lever 226 causing orifice structure 208 to return to its non-dispensing position. Removal of cartridge 106 from cartridge receptacle 316 causes lower pin section 224b to de-actuate water-proofed cartridge insertion status switch 222 mounted on pressurizing mechanism 104, thereby breaking the electrical connection between power supply 110 and electrical circuitry 202. The breaking of this electrical connection de-energizes voltage converter 204 and de-activates comparator circuitry 206. This de-energization increases the life of the power supply and increases safety for the operator by eliminating the shock hazard.

Rotary Orifice Structure

Referring now to FIGS. 5 and 6A-6C, depicted is apparatus 500 which is substantially identical to apparatus 100 with the exception of orifice structure 508. That is, apparatus 500 includes orifice structure 508 in lieu of orifice structure 208 as discussed above with respect to apparatus 500. Rotary orifice structure 508 has the same features as linear orifice structure 208 as best seen in the exploded, interior assembled, and exterior assembled views of FIGS. 6A, 6B, and 6C, respectively. Rotary orifice structures having a limited number of orifices are ideal for applications involving the need for producing sprays with different flow rates or plume geometries.

More specifically, orifice structure 508 includes insulator 602 and conductor 604. Insulator 602 is an insulating support structure capable of supporting conductor 604. Conductor 604 is electrically conductive and is in contact with local ground. Conductor 604 includes exit apertures 612 or groupings of exit apertures 612 that align with a corresponding orifice 614.

In one embodiment of the present invention, circular or cylindrical exit apertures 612 have diameters ranging from approximately 30 microns to approximately 125 microns. In an alternate embodiment, slits having widths ranging from approximately 30 microns to approximately 125 microns may be substituted for circular or cylindrical exit apertures 612 of similar size. This diameter is selected for the variety or reasons discussed above with respect to FIGS. 4A-4C.

In the depicted embodiment, insulator 602 is a substantially circular body manufactured of any suitable insulating material such as, but not limited to, plastic, bakelite, nylon, ceramic, PEEK, glass, lexan, and the like. In both dispensing and non-dispensing positions, insulator 602 entirely covers cartridge receptacle 116 and isolates it from the exterior of the apparatus (with the exception of exit apertures 612), thereby constraining the high voltage provided by converter contact 228 to emitter electrode 318 to the interior of apparatus 100 to prevent a shock hazard for the user.

Figure 6A:
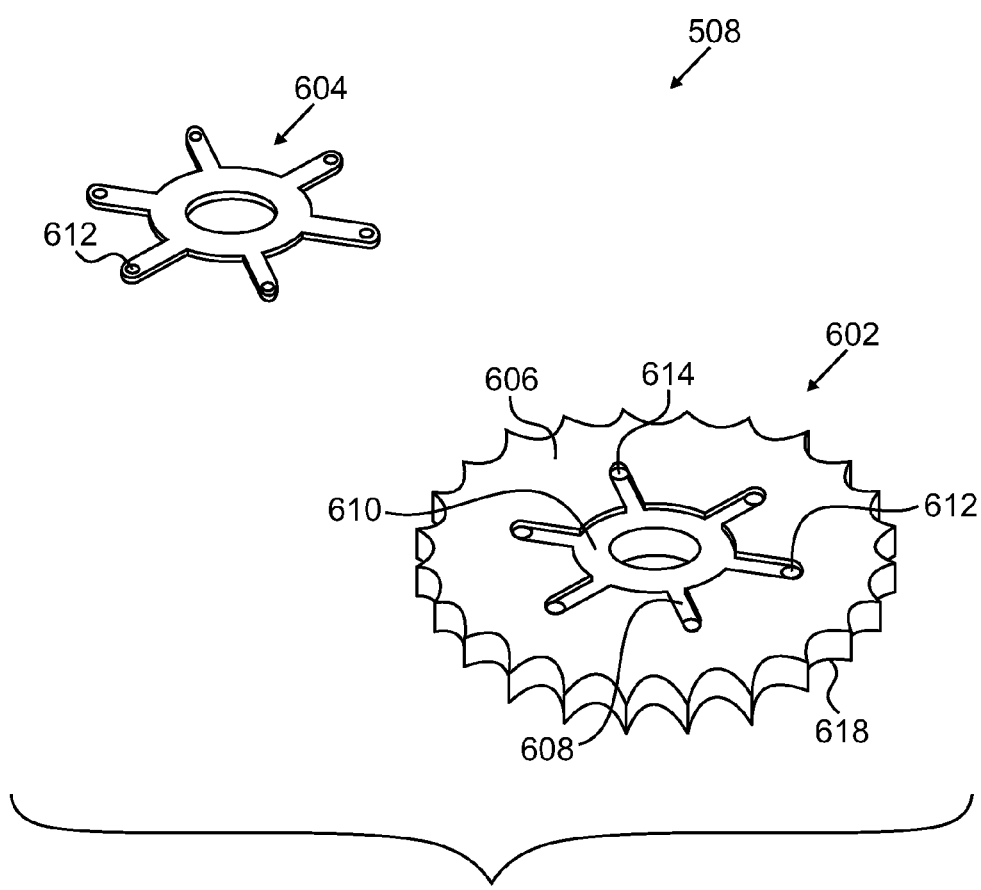
FIG. 6A is an exploded view of the rotary orifice structure of the disposable cartridge depicted in FIG. 5.

As best depicted in FIG. 6A, insulator 604 includes six orifices 614 arranged in a circular manner. While the depicted embodiment includes six individual and selectable orifices, greater or lesser quantities of orifices may be substituted without departing from the scope of the present invention. Also, orifices and corresponding exit apertures need not be identical and may be configured to meet specific needs. Additionally, non-rotary embodiments may also be substituted.

The peripheral edge of insulator 602 includes a plurality of substantially semi-cylindrical notches 618. Notches 618 are provided to facilitate movement of orifice structure 508 as required to dispense fluid 310 from reservoir 302 as discussed above with regards to apparatus 100. Notches 618 of insulator 602 mate with corresponding indexing structures integral to the activating mechanism. These indexing structures index orifice structure 508 to the desired position (i.e., dispensing or non-dispensing) when lever 226 is actuated by a user. That is, via engagement with notches 618, indexing structures move orifice structure 508 to a dispensing position in which an exit aperture 212 aligns with emitter electrode tip 320 to facilitate electrostatic atomization, or to a non-dispensing position in which insulator 602 covers emitter electrode 318 and the external end of fluid output passage 314, thereby sealing cartridge 106 from, and electrically isolating it from, the external environment.

In some embodiment of the invention, notches 618 also allow an operator to select one of a plurality of orifices such as orifices 614. Such selection may be desired when orifices having different characteristics are included to allow a user to select a specific orifice configuration. However, even if all orifices are identical, an operator may wish to select a new orifice if the current orifice is clogged or otherwise unusable. To facilitate this feature, in the case of a rotary orifice structure such as structure 508, lever 226 would be configured to permit rotation of orifice structure 508 without pressurization of cartridge 106. One method of doing this is to disable the return stroke of lever 226 when an operator is selecting an orifice and to enable the return stroke of lever 226 when a user wishes to pressurize reservoir 302 in an effort to spray fluid 310.

Orifices 614 in orifice structure 508, as illustrated, can have different exit aperture sizes and configurations, for example, even though only one exit aperture 612 is shown in each orifice 614. Different configurations and sizes are selected based upon, for example, the fluid used, the spray flow rate desired, and the intended use of the spray. In addition, the incorporation of multiple orifices 614 within orifice structure 508 allows an operator to select a new orifice 614 if the currently used orifice 614 becomes clogged or otherwise unusable. Such a feature increases the likelihood that an operator will have the ability to deplete all of fluid 310 in cartridge 106 prior to its replacement.

Figure 6B:
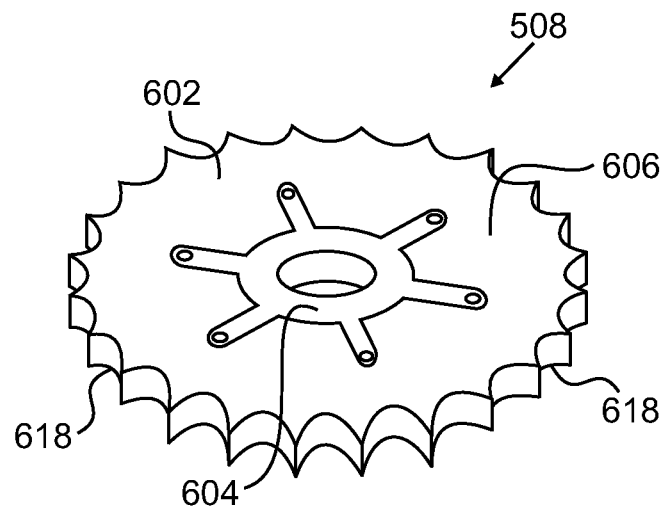
FIG. 6B is an assembled interior view of the rotary orifice structure of the disposable cartridge depicted in FIG. 5.
Figure 6C:
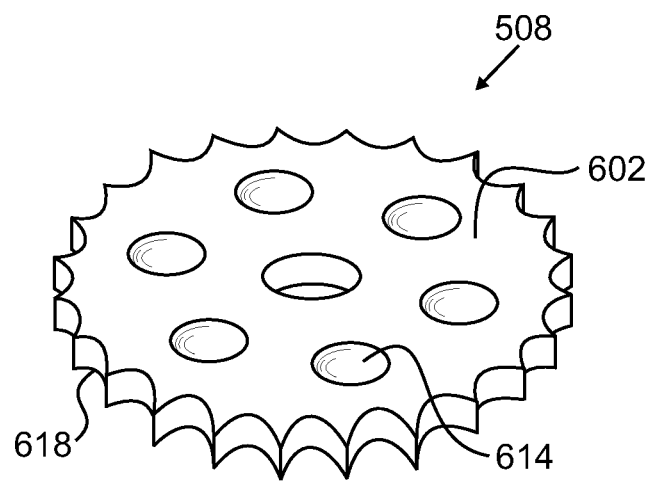
FIG. 6C is an assembled exterior view of the rotary orifice structure of the disposable cartridge depicted in FIG. 5.

Interior face 606 of insulator 602 includes recess 608 configured to mate with conductor 604 as best depicted in the exploded and assembled views of FIG. 6A and FIG. 6B, respectively. That is, groove 608 includes circular groove portion 610 and a series of linear groove extensions 612. Each groove extension 612 includes a corresponding orifice 614. As orifice extends through insulator 602 from its interior surface to an exterior surface, its diameter enlarges in a semi-spherical manner as best seen in the exterior assembled view of FIG. 6C.

Encased Rotary Orifice Structure

Figure 7A:
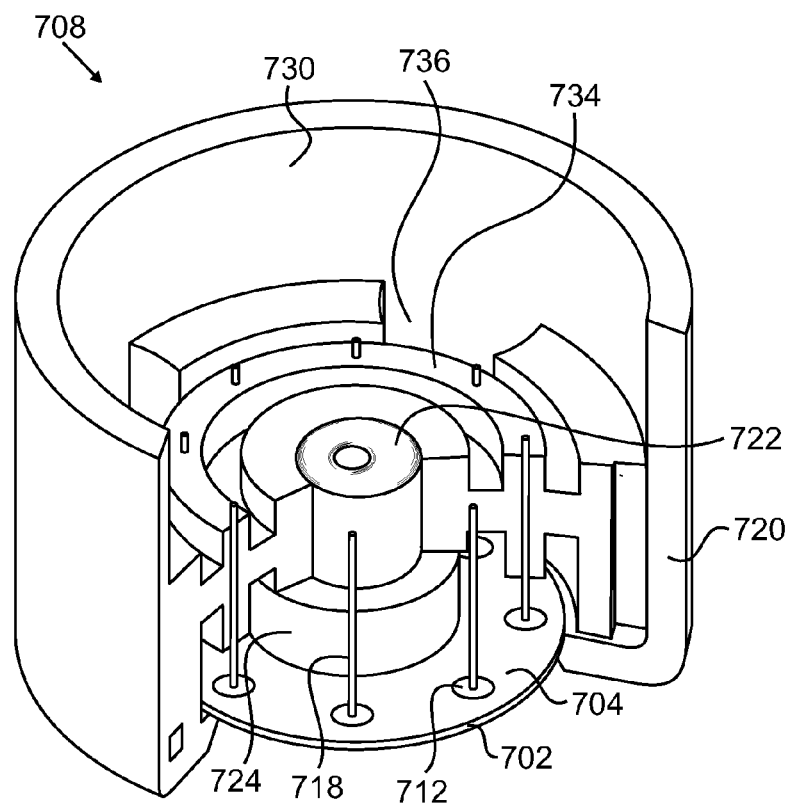
FIG. 7A is a cutaway interior view of an encased rotary orifice structure for use with the apparatus depicted in FIGS. 1-3.
Figure 7B:
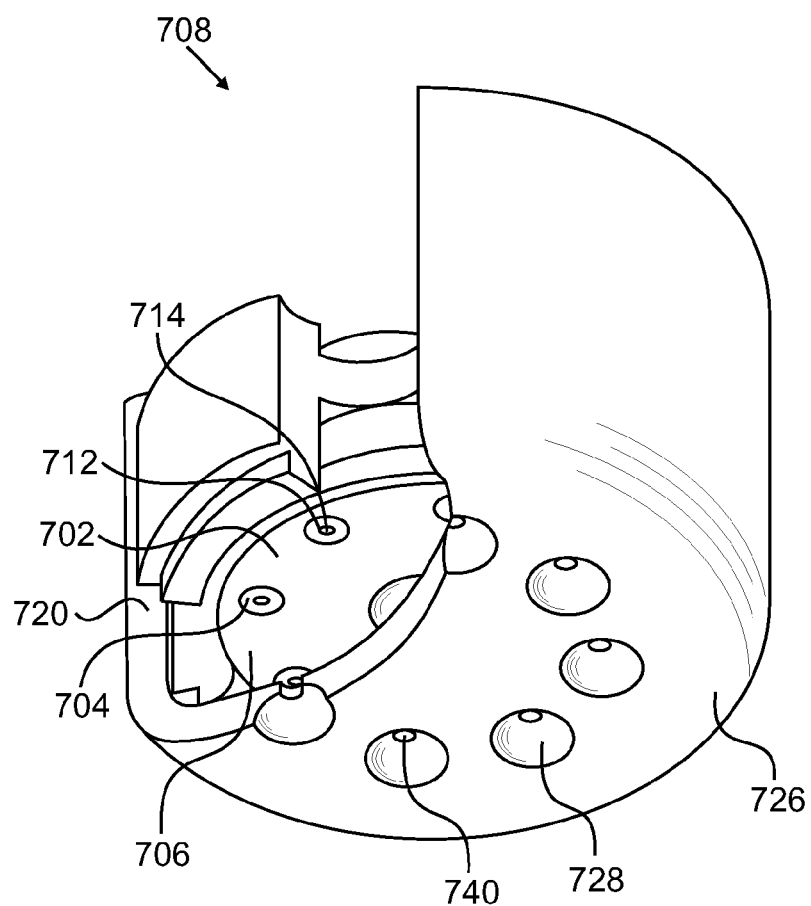
FIG. 7B is a cutaway exterior view of the encased rotary orifice structure of FIG. 7A.

Referring now to FIGS. 7A and 7B, depicted are cutaway interior and exterior views, respectively, of encased rotary orifice structure 708. That is, apparatus 100 as described above with respect to FIGS. 1-3 may incorporate encased rotary orifice structure 708 and fluid output channel 730 in lieu of orifice structure 208, emitter electrode 318, and fluid output passage 314 as discussed above with respect to apparatus 100.

Encased rotary orifice structures 708 having a limited number of conductor exit apertures 712 are ideal for applications involving the need for producing sprays with different flow rates or plume geometries. Encased rotary orifice structures are also ideal for diesel or direct internal combustion engine applications in which multiple orifices are used to provide high instantaneous flow rates and rapid turn-on and turn-off transients.

Orifice structure 708 includes insulator 702, conductor 704, conductor exit apertures 712, dedicated emitter electrodes 718, case 720, solenoid 722, armature 724, and insulating structure 734. Insulator 702 is an insulating support structure capable of supporting conductor 704. Conductor 704 is electrically conductive and is in contact with local ground via contact with grounded case 720. Conductor 704 includes conductor exit apertures 712 or groupings of conductor exit apertures 712 that align with a corresponding orifice 714. Each conductor exit aperture 712 has a corresponding and dedicated emitter electrode 718.

Case 720 is a substantially cylindrical conductive case bounded on its bottommost end by case floor 726. Case 720 encases and supports the electrostatic atomizer components, namely, insulator 702, conductor 704, dedicated emitter electrodes 718, solenoid 722, armature 724, and insulating structure 734. Insulating structure 734 is coupled to case 720 and each emitter electrode 718 passes therethrough. Insulating structure 734 maintains each emitter electrode 718 in a fixed position with reference to its corresponding conductor exit aperture 712 and case exit aperture 740 and ensures proper alignment of emitter electrodes 718 therewith. Insulating structure 734 includes passages 736 to allow fluid 310 to pass therethrough for atomization between emitter electrodes 718 and conductor exit apertures 712/case exit apertures 740.

As best depicted in FIG. 7B, case floor includes eight case orifices 728 arranged in a circular manner. While the depicted embodiment includes eight individual and selectable orifices, greater or lesser quantities of orifices may be substituted without departing from the scope of the present invention. Also, orifices and corresponding case exit apertures need not be identical and may be configured to meet specific needs. Further, multiple circular arrays of emitter electrode/conductor exit aperture/case exit aperture combinations may be incorporated to increase the fluid flow rates. As orifice extends through case floor 726 from its interior surface to an exterior surface, its diameter enlarges in a semi-spherical manner as best seen in the exterior view of FIG. 7B.

Rotary orifice structure 708 includes multiple conductor exit apertures 712 each serviced by a dedicated emitter electrode 718 to limit the feed pressure to levels well below the >1000 bar levels currently being used in conventional diesel injectors. Regardless of the quantity of conductor exit apertures, operation will be the same as described herein. Emitter electrode supply voltage and feed pressure are fixed and applied continuously. Spraying will occur whenever insulator 702 is rotated to a dispensing position as discussed herein, and spraying ceases whenever insulator 702 is rotated to a non-dispensing position.

In the depicted embodiment, insulator 702 is a substantially circular body manufactured of any suitable insulating material such as, but not limited to, plastic, bakelite, nylon, ceramic, PEEK, glass, lexan, and the like. In both dispensing and non-dispensing positions, insulator 702 entirely covers cartridge receptacle 116 and isolates it from the exterior of the apparatus (with the exception of conductor exit apertures 712 and case exit apertures 740), thereby constraining the high voltage provided to emitter electrodes 718 to the interior of rotary orifice structure 708 to prevent a shock hazard for the user.

As best depicted in FIG. 7A, insulator 702 includes eight exit apertures 712 arranged in a circular manner. While the depicted embodiment includes eight individual and selectable exit apertures, greater or lesser quantities of apertures may be substituted without departing from the scope of the present invention. Also, orifices 740 and corresponding conductor exit apertures 712 need not be identical and may be configured to meet specific needs.

In one embodiment of the present invention, circular or cylindrical conductor exit apertures 712 have diameters ranging from approximately 30 microns to approximately 125 microns. In an alternate embodiment, slits having widths ranging from approximately 30 microns to approximately 125 microns may be substituted for circular or cylindrical conductor exit apertures 712 of similar size. This diameter is selected for the variety or reasons discussed above with respect to FIGS. 4A-4C.

Orifices 714 in orifice structure 708 can have differently sized and/or configured conductor exit apertures 712, for example, even though only one conductor exit aperture 712 is shown in each orifice 714. Different configurations and sizes are selected based upon, for example, the fluid used, the spray flow rate desired, and the intended use of the spray.

Exterior face 706 of insulator 702 includes recess 708 (not shown) configured to mate with one or more conductors 704. Exterior face 706 of insulator 702 is in intimate contact with the inwardly facing surface of case floor 726. Conductor(s) 704 are in positive electrical contact with case 720 at all times.

Solenoid 722 is centrally positioned on the inwardly facing surface of insulator 702 and rotates armature 724, which is also affixed to the inwardly facing surface of insulator 702. Actuation of solenoid 722 can cause the orifice structure to be actuated in an oscillatory manner or with continuous controllable rotation.

When solenoid 722 is to be controlled in an oscillatory manner, the peripheral edge of case 720 includes one or more indexing tabs (not shown) for the accurate positioning of insulator 702 in a dispensing or non-dispensing position. The indexing tabs of case 720 mate with corresponding indexing structures that are integral to the activating mechanism. These indexing structures index insulator 702 to the desired position (i.e., dispensing or non-dispensing) when armature 724 is actuated by a user.

When insulator 702 is indexed to a dispensing position, conductor exit aperture 712 and its surrounding conductor 704 are axially aligned with its dedicated emitter electrode 718 and its corresponding case exit aperture 740 which causes the electrically conductive conductor 704 and emitter electrode 718 to form a charge injection electrostatic atomizer which electrostatically atomizes fluid 310 in fluid output channel 730. Conversely, when insulator 702 is indexed to a non-dispensing position, emitter electrode 718 is aligned with insulator 702 (rather than conductor 704) which seals fluid output channel 730. In addition, emitter electrode 718 ceases to act as an electrostatic atomizer, there is no current flow from emitter electrode 718, flow of fluid 310 is ceased, and the high voltage present at the emitter electrodes 718 is isolated from the exterior of the dispensing apparatus. Only the fluid contained in the low length to diameter ratio conductor exit apertures 712 is potentially subjected to non-optimal atomization during orifice structure transition. This aspect of the invention allows emitter electrodes 718 to be continuously maintained at operating voltage without damage to the dispensing apparatus or the fluid contained within and without danger to an operator. This aspect also allows spraying of fluid 310 to resume immediately upon indexing of insulator 702 to a dispensing position without the need to coordinate voltage or fluid profiles, as this position causes emitter electrodes 718 to realign with exit apertures 712.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A portable apparatus for electrostatically dispensing fluid comprising:

an activating mechanism;

a high voltage generator to provide a high voltage;

a power source to supply power to said high voltage generator;

a disposable cartridge, said disposable cartridge including:

a reservoir containing said fluid;

a fluid output channel extending from said reservoir through an exterior wall of a first end of said disposable cartridge; and a movable orifice structure located adjacent and external to said exterior wall of said first end of said disposable cartridge, said movable orifice structure including at least one exit aperture, a conductor, and an insulator, said at least one exit aperture passing through said conductor, said conductor electrically grounded when said disposable cartridge is located in said dispensing position, said insulator positioned to cover an external end of said fluid output channel and said emitter electrode when said movable orifice structure is located in a non-dispensing position thereby isolating said emitter electrode and said fluid from an environment external to said disposable cartridge, said movable orifice structure connected to said activating mechanism to be positioned thereby relative to said channel when said disposable cartridge is located in said dispensing position;

an emitter electrode including an emitter electrode tip and an emitter electrode contact, said emitter electrode contact located exterior to said disposable cartridge and said emitter electrode tip located internal to said disposable cartridge, said emitter electrode contact electrically connected to said high voltage generator for electrostatically charging said fluid when said disposable cartridge is in a dispensing position, said emitter electrode tip positioned to substantially axially align with one of said at least one exit apertures when said movable orifice structure is in said dispensing position; and an emitter electrode channel extending from said emitter electrode tip to said fluid output channel, said emitter electrode channel axially aligned with said emitter electrode tip;

a pressurizing mechanism connected to said activating mechanism to be driven thereby, said pressurizing mechanism located adjacent said disposable cartridge and in communication with a second end of said disposable cartridge for deforming and pressurizing said disposable cartridge;

a housing, said housing substantially enclosing at least a portion of said activating mechanism, said high voltage generator, said power source, and said pressurizing mechanism, said housing including a first cartridge receptacle for detachably receiving said disposable cartridge; and a spray charge dissipation mechanism.

2. An apparatus according to claim 1, wherein said spray charge dissipation mechanism is at least one of the group consisting of a static wick, a drag line, a brush strip, and combinations thereof.

3. An apparatus according to claim 1 wherein said high voltage generator is energized when said disposable cartridge is secured in said cartridge receptacle.

4. An apparatus according to claim 1 wherein said movable orifice structure is linear or rotary.

5. An apparatus according to claim 1, wherein said insulator of said movable orifice structure is connected to said activating mechanism via at least one notch.

6. An apparatus according to claim 1, wherein the movable orifice structure is rotary and further comprises:
  a solenoid coupled to said insulator;
  a secondary insulating structure surrounding said solenoid;
  a conductive case coupled to said conductor, said conductive case including at least one aperture, each of said apertures aligning with one of said at least one orifice; and
  a plurality of secondary emitter electrodes coupled to said secondary insulating structure, each of said plurality of secondary emitter electrodes aligned with one of said at least one orifice when said movable orifice structure is in said dispensing position.

7. An apparatus according to claim 6 wherein said solenoid is operated via continuous rotation or in an oscillatory manner.

8. An apparatus according to claim 1, wherein said emitter electrode is a thoriated tungsten wire electrode or lanthanum doped tungsten wire electrode having a diameter greater than 1 micron and less than 100 microns.

9. An apparatus according to claim 1 wherein said activating mechanism includes a lever.

10. An apparatus according to claim 1 wherein said reservoir is formed of a flexible, electrically insulating material.

11. An apparatus according to claim 1 wherein a size of said at least one exit aperture is less than 500 microns.

12. An apparatus according to claim 1 wherein a size of said at least one exit aperture is less than 125 microns.

13. An apparatus according to claim 1 wherein a size of said at least one exit aperture is less than 90 microns.

14. An apparatus according to claim 1 wherein a size of said at least one exit aperture is less than 70 microns.

15. An apparatus according to claim 1 wherein said at least one exit aperture is a slit.

16. An apparatus according to claim 15 wherein a width of said at least one exit aperture is less than 125 microns.

17. An apparatus according to claim 15 wherein a width of said at least one exit aperture is less than 70 microns.

18. An apparatus according to claim 15 wherein a width of said at least one exit aperture is approximately 50 microns.

* * * * *